US 012055870B2

United States Patent
Nie et al.

(10) Patent No.: US 12,055,870 B2
(45) Date of Patent: Aug. 6, 2024

(54) LIGHT SCANNING UNIT AND ELECTRONIC IMAGE FORMING APPARATUS

(71) Applicant: Zhuhai Pantum Electronics Co., Ltd., Zhuhai (CN)

(72) Inventors: Yongchao Nie, Zhuhai (CN); Chao Wang, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 507 days.

(21) Appl. No.: 17/346,260

(22) Filed: Jun. 13, 2021

(65) Prior Publication Data

US 2021/0302862 A1 Sep. 30, 2021

Related U.S. Application Data

(63) Continuation of application No. PCT/CN2019/125575, filed on Dec. 16, 2019.

(30) Foreign Application Priority Data

Dec. 29, 2018 (CN) .......................... 201811643322.2

(51) Int. Cl.
*H04N 1/04* (2006.01)
*G02B 26/12* (2006.01)
*G03G 15/043* (2006.01)

(52) U.S. Cl.
CPC ....... *G03G 15/0435* (2013.01); *G02B 26/123* (2013.01)

(58) Field of Classification Search
None
See application file for complete search history.

(56) References Cited

U.S. PATENT DOCUMENTS 6,469,772 B1 * 10/2002 Itabashi ............... G02B 26/123
355/49
2003/0146375 A1 * 8/2003 Ono ..................... G02B 26/124
250/234

(Continued)

FOREIGN PATENT DOCUMENTS

CN          1971337 A      5/2007
CN        101055448 A     10/2007

(Continued)

OTHER PUBLICATIONS

The World Intellectual Property Organization (WIPO) International Search Report With Translation and Written Opinion for PCT/CN2019/125575 Mar. 25, 2020 10 Pages (including translation).

*Primary Examiner* — Dung D Tran
(74) *Attorney, Agent, or Firm* — ANOVA LAW GROUP, PLLC (57) ABSTRACT

The present disclosure provides a light scanning unit and an electronic image forming apparatus including the light scanning unit. The light scanning unit includes a light source, a first optical unit, an optical deflector, and a second optical unit. The light source includes at least two light-emitting points; the at least two light-emitting points are distributed along a straight line; and an angle between an extension direction of a distribution line thereof and a main scanning direction or a secondary scanning direction of the light scanning unit includes an acute angle, where the main scanning direction is perpendicular to the secondary scanning direction. The first optical unit is configured to collimate at least two light beams emitted from the light source along the main scanning direction and to focus the at least two light beams emitted from the light source along the secondary scanning direction.

9 Claims, 4 Drawing Sheets

(56) References Cited

U.S. PATENT DOCUMENTS

| | | | | |
|---|---|---|---|---|
| 2007/0115528 A1* | 5/2007 | Kim | ................... | G02B 26/123 |
| | | | | 359/206.1 |
| 2008/0165244 A1* | 7/2008 | Tomioka | .............. | G02B 26/123 |
| | | | | 347/261 |
| 2009/0073528 A1* | 3/2009 | Miyatake | ............. | G02B 26/127 |
| | | | | 359/204.4 |
| 2011/0080624 A1* | 4/2011 | Ku | ...................... | G02B 26/124 |
| | | | | 358/475 |
| 2018/0239128 A1* | 8/2018 | Ominato | ................ | G03G 15/28 |
| 2018/0259875 A1* | 9/2018 | Sumida | ................ | G03G 15/011 |

FOREIGN PATENT DOCUMENTS

| | | |
|---|---|---|
| CN | 101226277 A | 7/2008 |
| CN | 102033313 A | 4/2011 |
| CN | 109521562 A | 3/2019 |

* cited by examiner

LIGHT SCANNING UNIT AND ELECTRONIC IMAGE FORMING APPARATUS

CROSS-REFERENCE TO RELATED APPLICATIONS

This application is a continuation application of International Application No. PCT/CN2019/125575, filed on Dec. 16, 2019, which claims priority of Chinese Patent Application No. 201811643322.2, filed with the China National Intellectual Property Administration (CNIPA) on Dec. 29, 2018, the entire content of all of which is incorporated herein by reference.

FIELD OF THE DISCLOSURE

The present disclosure generally relates to the technical field of image forming and, more particularly, relates to a light scanning unit and an electronic image forming apparatus.

BACKGROUND

Electronic image forming apparatuses, such as laser printers, copiers, printers and the like, are devices for forming images on recording media such as paper. In order to meet the market's demand for printing efficiency of electronic image forming apparatuses, it has become a trend for developing high-speed electronic image forming apparatuses.

Figure 1:
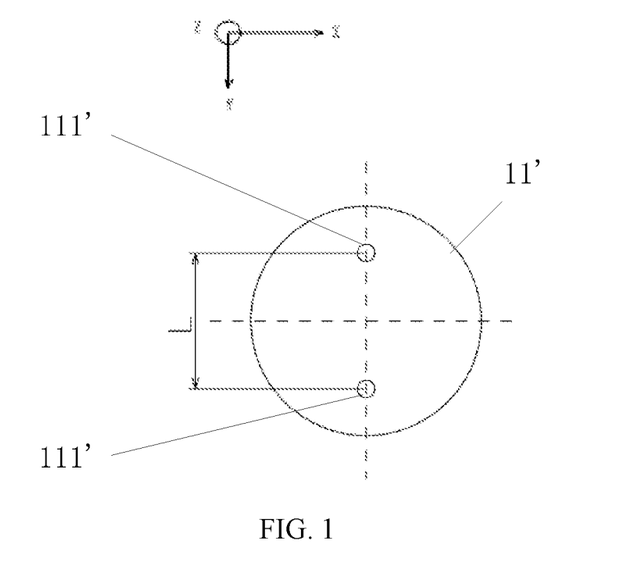
FIG. 1 illustrates a planar structural schematic of a light source of a light scanning unit in the existing technology.

The electronic image forming apparatus may include a light scanning unit. The light scanning unit may be configured to emit a light beam carrying image information to a photoreceptor, such that the photoreceptor may obtain and process the image information carried in the light beam. FIG. 1 illustrates a planar structural schematic of a light source of a light scanning unit in the existing technology. As shown in FIG. 1, in order to increase the light-exiting power of the light exited from the light scanning unit, a plurality of light-emitting points may be disposed, along a secondary scanning printing direction, in a same light source of the light scanning unit in the existing technology, and the normal operation of the light scanning unit may be ensured by a manner of independently controlling each light-emitting point.

Figure 2:
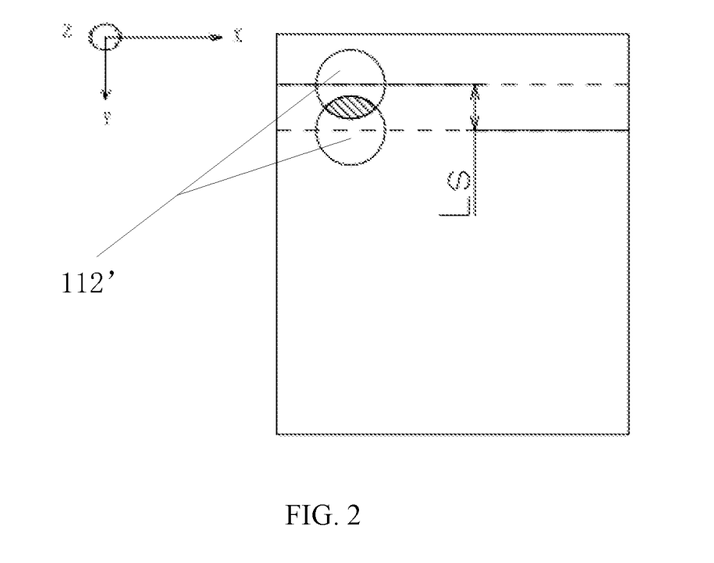
FIG. 2 illustrates a schematic of image forming of a light scanning unit on a scanned surface in the existing technology.

FIG. 2 illustrates a schematic of image forming of the light scanning unit on a scanned surface in the existing technology. As shown in FIG. 2, when the light source structure of the light scanning unit shown in FIG. 1 is used, two adjacent light spots of the light scanning unit on the scanned surface may interfere with each other. Therefore, the accuracy of the image information acquired by the photoreceptor may be affected, which may result in the problem of low image quality presented by the electronic image forming apparatus.

BRIEF SUMMARY OF THE DISCLOSURE

In order to solve the interference between the light spots formed by the light beams emitted from the plurality of light-emitting points of the light scanning unit incident on the scanned surface, which affects the accuracy of the image information obtained by the photoreceptor and further results in the problem of low image quality presented by the electronic image forming apparatus, the present disclosure provides a light scanning unit and an electronic image forming apparatus.

One aspect of the present disclosure provides a light scanning unit, including a light source, a first optical unit, an optical deflector, and a second optical unit. The light source includes at least two light-emitting points for diverging light beams; the at least two light-emitting points are distributed along a straight line; and an angle between an extension direction of a distribution line of the at least two light-emitting points and a main scanning direction or a secondary scanning direction of the light scanning unit includes an acute angle. The main scanning direction is perpendicular to the secondary scanning direction. The first optical unit is configured to collimate at least two light beams emitted from the light source along the main scanning direction and to focus the at least two light beams emitted from the light source along the secondary scanning direction. The optical deflector is configured to deflect at least two light beams emitted from the first optical unit and drive the deflected at least two light beams to scan as the optical deflector rotates. The second optical unit is configured to make the at least two light beams deflected and scanned by the optical deflector form an image on a scanned surface. A following expression is satisfied: $(\beta s/\beta m)^2 > 0.6$, where $\beta m$ denotes a magnification of an optical system of the light scanning unit along the main scanning direction; and $\beta s$ denotes a magnification of the optical system of the light scanning unit along the secondary scanning direction.

Optionally, the magnification $\beta m$ of the optical system of the light scanning unit along the main scanning direction and the magnification $\beta s$ of the optical system of the light scanning unit along the secondary scanning direction also satisfies a following expression:

$$\beta s/\beta m > 0.77.$$

Optionally, the magnification $\beta m$ of the optical system of the light scanning unit along the main scanning direction and the magnification $\beta s$ of the optical system of the light scanning unit along the secondary scanning direction also satisfies a following expression:

$$0.77 < \beta s/\beta m < 1.67; \text{ or } 0.6 < (\beta s/\beta m)^2 < 2.8.$$

Optionally, the light scanning unit further includes: a diaphragm unit, and the diaphragm is configured to shape the light beams emitted from the light source.

Optionally, the light scanning unit further includes: a synchronization signal detecting unit for receiving the light beams deflected from the optical deflector. The synchronization signal detecting unit is configured to detect and obtain a synchronization signal; and the synchronization signal is configured to determine a starting position of the light scanning unit when forming the image on the scanned surface. Optionally, $\beta m$ is 6.25, and $\beta s$ is 5.037.

Optionally, the optical deflector includes a polyhedral main body; and a surface of the polyhedral main body forms a plurality of reflecting mirror surfaces; and the polyhedron main body rotates along a rotating axle, and a central axis of the rotating axle is in parallel with the secondary scanning direction.

Optionally, the second optical unit is an F-θ lens.

Another aspect of the present disclosure provides an electronic image forming apparatus, including the disclosed light scanning unit and a photoreceptor. The light scanning unit and the photoreceptor are arranged cooperatively, and light beams emitted from the light scanning unit are focused to form an image on a photoreceptive surface of the photoreceptor. The photoreceptor is a photosensitive drum, and the photoreceptive surface is a scanned surface; and the electronic image forming apparatus further includes a charging roller, a developing unit, a cleaning unit, a transfer roller, and a fixing unit. The charging roller rotates and is in contact with the photosensitive drum, such that a focused image on the scanned surface of the photosensitive drum is charged to form an electrostatic latent image. The developing unit and the photosensitive drum are arranged cooperatively, such that the electrostatic latent image on the photosensitive drum absorbs a developing material in the developing unit to form a developed image. The transfer roller is abutted against the photosensitive drum to transfer the developed image on the photosensitive drum to a recording medium between the transfer roller and the photosensitive drum, for the fixing unit to perform a fixing processing on the developed image transferred to the recording medium. The cleaning unit is configured to remove the developing material remaining on the photosensitive drum after transferring the developed image.

The present disclosure provides the light scanning unit and the electronic image forming apparatus including the scanning unit. The light scanning unit may be disposed with the light source, the first optical unit, the optical deflector and the second optical unit. The light source may include at least two light-emitting points; at least two light-emitting points may be distributed along a straight line; and the angle between the extension direction of the distribution line of at least two light-emitting points and the main scanning direction or the secondary scanning direction of the light scanning device may include an acute angle, where the main scanning direction is perpendicular to the secondary scanning direction. The first optical unit may be configured to collimate the light beams emitted from the light source along the main scanning direction and focus the light beams along the secondary scanning direction. The optical deflector may be configured for deflecting the light beams emitted from the first optical unit as the optical deflector rotates, such that the deflected light beams may form images on the preset scanned surface under the focusing action of the second optical unit. At least two light-emitting points in the light source are distributed along a straight line, and the angle between the extension direction of the distribution line and the main scanning direction or the secondary scanning direction of the optical scanning device includes an acute angle, such that the distance between the light spots formed by the light beams emitted from at least two light-emitting points incident on the scanned surface along the main scanning direction may be increased, which avoids the occurrence of interference phenomenon and improves the image quality.

BRIEF DESCRIPTION OF THE DRAWINGS

The drawings herein may be incorporated into the specification and form a portion of the present specification, which illustrates embodiments consistent with the present disclosure and is used together with the specification to describe the principle of the present disclosure.

Particular embodiments of the present disclosure may be illustrated through the above-mentioned drawings, which may be described in more detail below. These drawings and text descriptions may not be intended to limit the concept scope of the present disclosure in any way, but to explain the concept of the present disclosure for those skilled in the art by referring to particular embodiments.

DETAILED DESCRIPTION

In order to more clearly illustrate the objectives, technical solutions, and advantages of various embodiments of the present disclosure, the technical solutions in various embodiments of the present disclosure may be described clearly and completely in conjunction with the accompanying drawings in various embodiments of the present disclosure.

Electronic image forming apparatuses, such as laser printers, copiers, printers and the like, are devices for forming images on recording media such as paper. In order to meet the market's demand for printing efficiency of electronic image forming apparatuses, it has become a trend for developing high-speed electronic image forming apparatuses.

The electronic image forming apparatus may include a light scanning unit. The light scanning unit may be configured to emit a light beam carrying image information to a photoreceptor, such that the photoreceptor may obtain and process the image information carried in the light beam. FIG. 1 illustrates a planar structural schematic of a light source of a light scanning unit in the existing technology. As shown in FIG. 1, in order to increase the light-exiting power of the light exited from the light scanning unit, a plurality of light-emitting points 111' may be disposed, along a secondary scanning printing direction, in a same light source 11' of the light scanning unit in the existing technology, and the normal operation of the light scanning unit may be ensured by a manner of independently controlling each light-emitting point 111'.

FIG. 2 illustrates a schematic of image forming of the light scanning unit on a scanned surface in the existing technology. As shown in FIG. 2, normally, the size of the light spot 112' formed on the scanned surface of the light beam emitted from the two light-emitting points 111' may be about 70 microns. When the printing resolution is 600 dpi, the center distance Ls of the image forming light spots 112' of the two light-emitting points 111' along a secondary scanning direction Y may be about 42.3 microns. Since the image forming light spots 112' of the two light-emitting points 111' are arranged along the direction in parallel with the secondary scanning direction Y, such that the two image forming light spots 112' may interfere with each other along the secondary scanning direction Y. Therefore, the accuracy of the image information acquired by the photoreceptor may be affected, which may further result in the problem of low image quality presented by the electronic image forming apparatus.

It should be noted that exemplary embodiments maybe be described in detail herein, and examples thereof may be shown in the accompanying drawings. When the following description refers to the drawings, unless otherwise indicated, same numbers in different drawings may indicate same or similar elements. The implementation manners described in the following exemplary embodiments may not represent all implementation manners consistent with the present disclosure. In contrast, such implementation manners may merely be examples of apparatuses and methods consistent with some aspects of the present disclosure as detailed in the appended claims.

The technical solutions of the present disclosure and how the technical solutions of the present application solve the above-mentioned technical problems may be described in detail with particular embodiments hereinafter. The following particular embodiments may be combined with each other, and same or similar concepts or processes may not be repeated in some embodiments. Various embodiments of the present disclosure may be described below in conjunction with the accompanying drawings.

Figure 3:
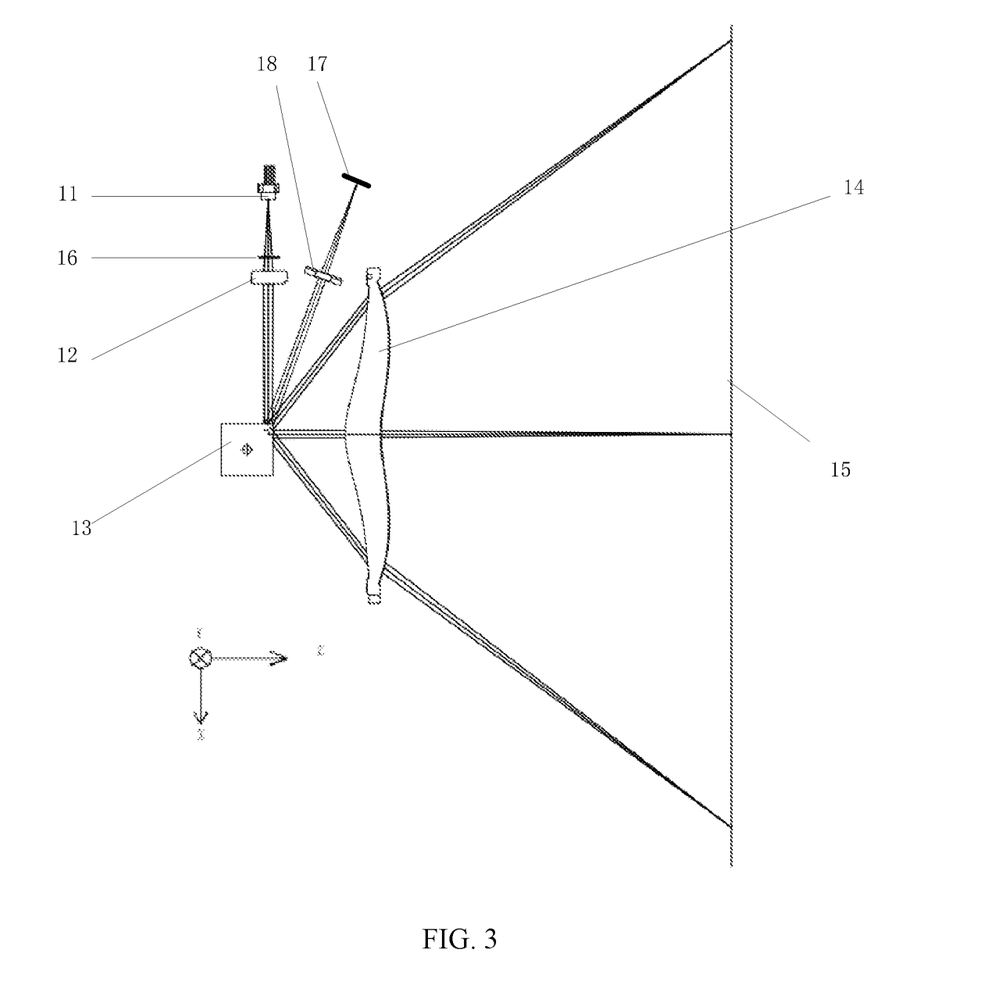
FIG. 3 illustrates a structural schematic of a light scanning unit according to various embodiments of the present disclosure.
Figure 4:
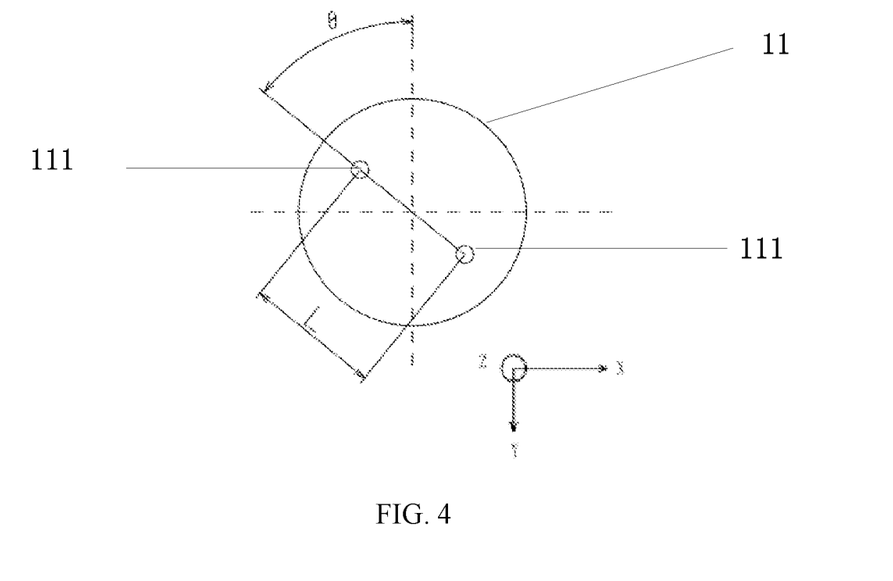
FIG. 4 illustrates a planar structural schematic of a light source of a light scanning unit according to various embodiments of the present disclosure.

FIG. 3 illustrates a structural schematic of a light scanning unit according to various embodiments of the present disclosure; and FIG. 4 illustrates a planar structural schematic of a light source of a light scanning unit according to various embodiments of the present disclosure.

As shown in FIG. 3, the light scanning unit may include a light source 11, a first optical unit 12, an optical deflector 13, and a second optical unit 14.

The light source 11 may include at least two light-emitting points 111 for diverging light beams; at least two light-emitting points 111 may be distributed along a straight line; and the angle between the extension direction of the distribution line of at least two light-emitting points and the main scanning direction or the secondary scanning direction of the light scanning device may include an acute angle, where the main scanning direction may be perpendicular to the secondary scanning direction.

The first optical unit 12 may be configured for collimating at least two light beams emitted from the light source 11 along the main scanning direction and focusing at least two light beams emitted from the light source 11 along the secondary scanning direction.

The optical deflector 13 may be configured to deflect and scan at least two light beams emitted from the first optical unit as the optical deflector 13 rotates, such that at least two deflected light beams may form at least two image forming light spots 112 on a preset scanned surface 15 under the focusing action of the second optical unit 14, where as the optical deflector 13 rotates, each image forming spot 112 may form a scan line; and at a same scanning time, at least two light-emitting points 111 may be distributed along a straight line; and the angle between the extension direction of the distribution line of at least two light-emitting points 111 and the main scanning direction or the secondary scanning direction of the light scanning device may include an acute angle.

Specifically, the light scanning unit provided in one embodiment may be used on electronic image forming apparatuses such as laser printers, copiers, printers and the like. In one implementation manner, the light source 11, the first optical unit 12, the optical deflector 13, and the second optical unit 14 may be disposed sequentially.

Taking the structure shown in FIG. 4 as an example, the difference from the existing technology may be that the light source 11 in one implementation manner may include two light-emitting points 111; two light-emitting points 111 may be distributed along a straight line; and the angle between the extension direction of the distribution line of two light-emitting points 111 and the secondary scanning direction Y may be an acute angle θ.

Each light-emitting point 111 shown in FIG. 3 may emit a light beam carrying image information under the independent control of a control unit (not shown in FIG. 3), and the emitted light beam may be transmitted to the first optical unit 12. Under the action of the first optical unit 12, the beam may be collimated along a main scanning direction X and focused along the secondary scanning direction Y. That is, the light beam emitted from the first optical unit 12 may be parallel light along the main scanning direction X and convergent light along the secondary scanning direction Y; and the light beam may be transmitted to the optical deflector 13. Optionally, the first optical unit 12 may be an anamorphic lens or a cylindrical collimating lens, which may be made of a plastic material.

The optical deflector 13 may include a polyhedral main body structure; a plurality of reflecting mirror surfaces may be formed on the surface of the polyhedral main body; meanwhile, the polyhedron main body may rotate at a preset speed along a rotating axle, and the central axis of the rotating axle may be in parallel with the secondary scanning direction Y of the scanned surface 15. That is, the above-mentioned light beam which is parallel light along the main scanning direction X and converged light along the secondary scanning direction Y may be transmitted to the reflecting mirror surface of the optical deflector 13 and may be deflected as the optical deflector 13 rotates, thereby forming a deflected light beam which is deflected toward the preset direction of the scanned surface 15. Subsequently, the deflected light beam may be focused by the second optical unit 14 and form an image forming spot 112 on the preset scanned surface 15, where the focusing action of the second optical unit 14 may simultaneously act on the main scanning direction X and the secondary scanning direction Y of the light beam. Optionally, the second optical unit 14 may be an F-θ lens, for example, a single F-θ lens, or multiple F-θ lenses which may be made of a plastic material or a glass material.

Therefore, under the action of the above-mentioned optical devices, at least two image forming light spots 112 which are distributed along a straight line may appear on the preset scanned surface 15 of the light scanning unit; and the angle between the extension direction of the distribution line of at least two image forming light spots 112 and the main scanning direction or the secondary scanning direction of the optical scanning device may include an acute angle.

Figure 5:
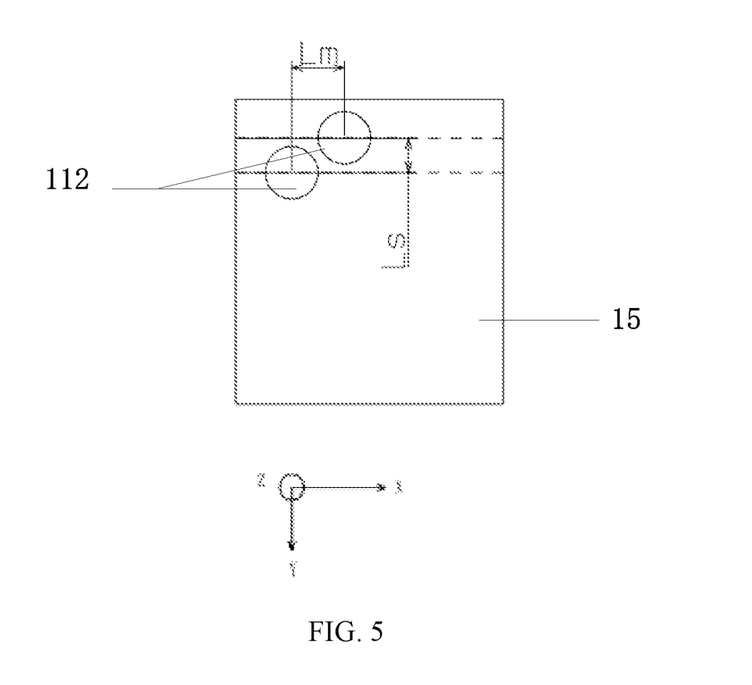
FIG. 5 illustrates a schematic of image forming of a light scanning unit on a scanned surface according to various embodiments of the present disclosure.

It should be noted that FIG. 5 illustrates a schematic of image forming of the light scanning unit on the scanned surface according to various embodiments of the present disclosure. As shown in FIG. 5, in the light scanning unit, compared with the existing technology, the light spot size of the light beam emitted from the two light-emitting points 111 may be about 70 microns; when the printing resolution is 600 dpi, the light spot size of the light beam emitted from the two light-emitting points 111 may be about 70 microns; when the center distance Ls of the image forming light spots 112 of the two light-emitting points 111 is maintained at about 42.3 microns along the secondary scanning direction Y, since the center distance Lm of the two image forming light spots 112 is not 0 along the main scanning direction X, the interference probability may be greatly reduced, thereby effectively improving the accuracy of the image information acquired by the photoreceptor and further improving the image quality presented by the electronic image forming apparatus.

In other optional implementation manners, the light scanning unit may further include a diaphragm unit 16. The diaphragm unit 16 may specifically be provided with a light-transmitting hole to limit the size of the light beam and shape the light beam emitted from the light source. Specifically, the diaphragm unit 16 may be disposed between the light source 11 and the first optical unit 12 to limit the size of the light beam emitted from the light source 11, may also be disposed between the first optical unit 12 and the optical deflector 13, and may also be disposed at other position of the light scanning unit, which may not be limited in the present disclosure.

In other optional implementation manners, the light scanning unit may further include a synchronization signal detecting unit 17 which receives the light beam deflected from the optical deflector 13; the synchronization signal detecting unit 17 may be configured to detect and obtain a synchronization signal; and the synchronization signal may be configured to determine the starting position of the light scanning unit when performing image formation on the scanned surface 15. The detection method adopted by the synchronization signal detecting unit may be described the existing technology, which may not be limited by the present disclosure. Furthermore, in order to further improve the detection accuracy of the synchronization signal, a third optical unit 18 may also be disposed between the synchronization signal detecting unit 17 and the optical deflector 13. The third optical unit 18 may converge the deflected light beams. That is, the third optical unit 18 may converge the light beam along the main scanning direction X and the secondary scanning direction Y simultaneously, such that the deflected convergent beam may be focused on the detection surface of the above-mentioned synchronization signal detecting unit 17. Meanwhile, the material and morphology of the third optical unit 18 may not be limited in the present application.

In order to further describe the light scanning unit provided in one embodiment, a plurality of optional implementation manners may be provided as the following.

In order to further avoid interference phenomena on the scanned surface 15 and to reduce light intensity loss, in one of the implementation manners, the magnification $\beta m$ of the optical system of the light scanning unit along the main scanning direction and the magnification $\beta s$ of the optical system of the light scanning unit along the secondary scanning direction may satisfy the following expression 1 or expression 2:

$$\beta s/\beta m > 0.77; \text{ and} \quad \text{[expression 1]}$$

$$(\beta s/\beta m)^2 > 0.6. \quad \text{[expression 2]}$$

Furthermore, the magnification $\beta m$ of the optical system of the light scanning unit along the main scanning direction and the magnification $\beta s$ of the optical system of the light scanning unit along the secondary scanning direction may satisfy the following expression 3 or expression 4:

$$0.77 < \beta s/\beta m < 1.67; \text{ and} \quad \text{[expression 3]}$$

$$0.6 < (\beta s/\beta m)^2 < 2.8. \quad \text{[expression 4]}$$

Specifically, still taking the structure shown in FIGS. 4-5 as an example, it is assumed that:

two light-emitting points 111 are disposed on the light source 11, and the distance between the centers of the two light-emitting points 111 is L; the angle between the extension direction of the distribution line of the two light-emitting points 111 and the secondary scanning direction Y of the light scanning device is $\theta$; on the preset scanned surface 15, the distance between the two image forming light spots 112 along the main scanning direction X is Lm, and the distance along the secondary scanning direction Y is Ls; the magnification of the optical system of the light scanning unit along the main scanning direction is $\beta m$; and the magnification of the optical system of the light scanning unit along the secondary scanning direction is $\beta s$.

Therefore, according to the optical image forming principle, it may obtain that the magnification of the light scanning unit along the main scanning direction X is $\beta m \cdot Lm/(L \times \sin \theta)$, the magnification of the light scanning unit along the secondary scanning direction Y is $\beta s = Ls/(L \times \cos \theta)$, and $\beta s/\beta m = (Ls/Lm) \times \tan \theta$.

In one implementation manner, when $\beta s/\beta m > 0.77$ or $(\beta s/\beta m)^2 > 0.6$, compared with the light beam emitted from the light-emitting point 111, the loss rate of the light intensity of the image forming light spot 112 may be less than 10%. Table 1 provides an example for an implementation manner.

TABLE 1

| Optical resolution | 600 dpi |
|---|---|
| Distance L between centers of light-emitting points | 14 μm |
| Reference wavelength λ | 788 nm |
| Ls | 42.3 μm |
| Lm | 70 μm |
| θ | 53.14° |

When using the parameter structure shown in Table 1, $\beta m$ is 6.25; $\beta s$ is 5.037; $\beta s/\beta m$ is 0.806, which is greater than 0.77; $(\beta s/\beta m)^2$ is 0.65, which is greater than 0.6. Moreover, it is measured that the loss rate of the light intensity of the image forming light spot 112 may be less than 5%, and the image quality may be effectively improved.

Table 2 provides an example for an implementation manner.

TABLE 2

| Optical resolution | 600 dpi |
|---|---|
| Distance L between centers of light-emitting points | 14 μm |
| Reference wavelength λ | 788 nm |
| Ls | 42.3 μm |
| Lm | 70 μm |
| θ | 60° |

When using the parameter structure shown in Table 2, $\beta m$ is 5.77; $\beta s$ is 6.05; $\beta s/\beta m$ is 1.05, which is greater than 0.77; $(\beta s/\beta m)^2$ is 1.10, which is greater than 0.6. Moreover, it is measured that the loss rate of the light intensity of the image forming light spot 112 may be less than 10%, and the image quality may be effectively improved.

Obviously, by comparing the parameter structure shown in Table 2 with the parameter structure shown in Table 1, as $\theta$ increases, the magnification $\beta m$ along the main scanning direction and the magnification $\beta s$ along the secondary scanning direction may be varied accordingly, such that Lm may be easier to meet the requirement of 70 microns or more, which may effectively improve the image quality.

Table 3 provides an example for an implementation manner.

TABLE 3

| Optical resolution | 600 dpi |
|---|---|
| Distance L between centers of light-emitting points | 14 μm |
| Reference wavelength λ | 788 nm |

TABLE 3-continued

| | |
|---|---|
| Ls | 42.3 μm |
| Lm | 90 μm |
| θ | 60° |

When using the parameter structure shown in Table 3, βm is 7.42; βs is 6.05; βs/βm is 0.814, which is greater than 0.77; (βs/βm)$^2$ is 0.663, which is greater than 0.6. Moreover, it is measured that the loss rate of the light intensity of the image forming light spot 112 may be less than 5%, and the image quality may be effectively improved.

Obviously, by comparing the parameter structure shown in Table 2 with the parameter structure shown in Table 1, as θ increases, the magnification βm along the main scanning direction and the magnification βs along the secondary scanning direction may be varied accordingly, such that Lm may be easier to meet the requirement of 70 microns or more, which may effectively improve the image quality.

Referring to the parameter structures shown in Tables 1 to 3, the magnification ratio between the magnification βs along the secondary scanning direction Y may be relatively small compared with the magnification βm along the main scanning direction X of the optical scanning unit 1. As a result, the tolerance sensitivity along the secondary scanning direction Y may be reduced, thereby ensuring the optical and mechanical characteristics of the light scanning unit, reducing the light intensity loss rate of the image forming light spot 112, and improving the image quality.

The light scanning unit provided by the present disclosure may be disposed with the light source, the first optical unit, the optical deflector and the second optical unit. The light source may include at least two light-emitting points; at least two light-emitting points may be distributed along a straight line; and the angle between the extension direction of the distribution line of at least two light-emitting points and the main scanning direction or the secondary scanning direction of the light scanning device may include an acute angle, where the main scanning direction is perpendicular to the secondary scanning direction. The first optical unit may be configured to collimate the light beam emitted from the light source along the main scanning direction and focus the light beam emitted from the light source along the secondary scanning direction. The optical deflector may be configured for deflecting the light beam emitted from the first optical unit as the optical deflector rotates, such that the deflected light beam may form the image on the preset scanned surface under the focusing action of the second optical unit. At least two light-emitting points in the light source are distributed along a straight line, and the angle between the extension direction of the distribution line and the main scanning direction and the secondary scanning direction of the optical scanning device includes an acute angle, such that the distance between the light spots formed by the light beams emitted from at least two light-emitting points on the scanned surface along the main scanning direction may be increased, which avoids the occurrence of interference phenomenon and improves the image quality.

The present disclosure also provides an electronic image forming apparatus, including the light scanning unit and the photoreceptor described in any one of the above-mentioned embodiments, where the light scanning unit and the photoreceptor may be arranged cooperatively, and the light beams emitted from the light scanning unit may be focused to form images on the photoreceptive surface of the photoreceptor.

It should be noted that with the shape difference of the electronic image forming apparatus, the photoreceptor may be different main body structures. For example, when the electronic image forming apparatus is a laser printer, the photoreceptor may be a photosensitive drum, and the photoreceptive surface may be a photosensitive surface.

Figure 6:
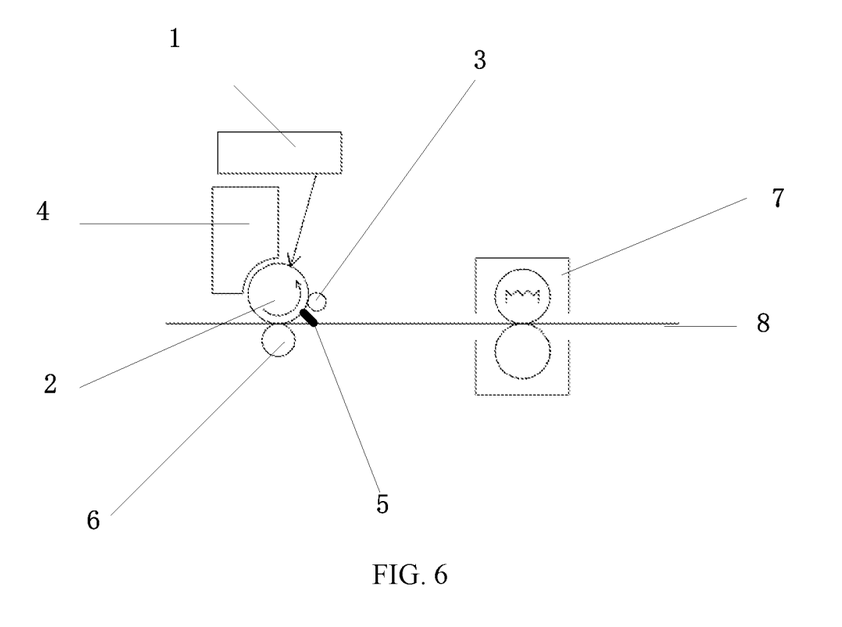
FIG. 6 illustrates a structural schematic of an electronic image forming apparatus according to various embodiments of the present disclosure.

FIG. 6 illustrates a structural schematic of an electronic image forming apparatus according to various embodiments of the present disclosure. As shown in FIG. 6, the electronic image form apparatus may include: a light scanning unit 1, a photosensitive drum 2, a charging roller 3, a developing unit 4, a cleaning unit 5, a transfer roller 6, and a fixing unit 7.

The charging roller 3 may rotate and be in contact with the photosensitive drum 2, such that the focused image on the photosensitive surface of the photosensitive drum 2 may be charged to form an electrostatic latent image.

The developing unit 4 and the photosensitive drum 2 may be arranged cooperatively, such that the electrostatic latent image on the photosensitive drum 2 may absorb the developing material in the developing unit 4 to form a developed image.

The transfer roller 6 may be abutted against the photosensitive drum 2 to transfer the developed image on the photosensitive drum 2 to the recording medium 8 between transfer roller 6 and the photosensitive drum 2, for the fixing unit 7 to fix the developed image transferred to the recording medium 8.

The cleaning unit 5 may be configured to remove the developing material residue on the photosensitive drum 2 after transferring the developed image.

Specifically, in order to print an image, the light beam emitted from the light scanning unit 1 may be scanned onto the photosensitive surface of the photosensitive drum 2, which has a cylindrical metal tube with an outer circumference and a photosensitive layer of a preset thickness formed on the outer circumference. The charging roller 3 may rotate and be in contact with the photosensitive drum 2 to charge the surface of the photosensitive drum 2 to an even electric potential. The light scanning unit 1 may scan along the main scanning direction to adjust the light beam according to the image information, thereby forming the electrostatic latent image on the photosensitive surface. In such case, as the photosensitive drum 2 rotates, the photosensitive surface may move along the secondary scanning direction, and the light scanning unit 1 may scan the light beam onto the photosensitive surface along the main scanning direction in synchronization with a horizontal synchronization signal. Therefore, the two-dimensional electrostatic latent image may be formed on the photosensitive surface of the photosensitive drum 2.

The developing unit 4 may be in contact with the photosensitive drum 2 and transfer the developing material to the surface of the photosensitive drum 2, thereby forming the developed image. As the photosensitive drum 2 rotates, the developed image on the photosensitive surface may be pressed onto the recording medium. The transfer roller 6 may have a certain voltage, which is easier for the developed image on the photosensitive surface to be absorbed onto the recording medium 8; and after the transfer, the remaining developing material on the photosensitive surface may be removed by the cleaning unit 5. The developed image transferred to the recording medium 8 may be fixed to the recording medium 8 through a fixing process such as heating and pressing by the fixing unit 7, thereby completing the printing operation.

The electronic image forming apparatus of the optical scanning unit may be provided in various embodiments of the present disclosure. The optical scanning unit may be disposed with the light source, the first optical unit, the optical deflector and the second optical unit in the optical scanning unit. The light source may include at least two light-emitting points; at least two light-emitting points may be distributed along a straight line; and the angle between the extension direction of the distribution line of at least two light-emitting points and the main scanning direction or the secondary scanning direction of the light scanning device may include an acute angle, where the main scanning direction is perpendicular to the secondary scanning direction. The first optical unit may be configured to collimate the light beam emitted from the light source along the main scanning direction and focus the light beam emitted from the light source along the secondary scanning direction. The optical deflector may be configured for deflecting the light beam emitted from the first optical unit as the optical deflector rotates, such that the deflected light beam may form the image on the preset scanned surface under the focusing action of the second optical unit. As a result, the distance between the light spots formed by the light beams emitted from at least two light-emitting points on the scanned surface along the main scanning direction may be increased, which avoids the occurrence of interference phenomenon and improves the image quality.

It should be finally noted that the above-mentioned embodiments may be merely used to illustrate, but not to limit, the technical solutions of the present disclosure. Although the present disclosure has been described in detail with reference to the above-mentioned embodiments, those skilled in the art should understand that it may be still possible to modify the technical solutions described in the above-mentioned embodiments, or equivalently replace some or all of the technical features. Furthermore, these modifications or replacements may not cause the essence of the corresponding technical solutions to deviate from the scope of the technical solutions of various embodiments of the present disclosure.

What is claimed is:

1. A light scanning unit, comprising:
a light source, a first optical unit, an optical deflector, and a second optical unit, wherein:
the light source includes at least two light-emitting points for diverging light beams; the at least two light-emitting points are distributed along a straight line; and an angle between an extension direction of a distribution line of the at least two light-emitting points and a main scanning direction or a secondary scanning direction of the light scanning unit includes an acute angle, wherein the main scanning direction is perpendicular to the secondary scanning direction;
the first optical unit is configured to collimate at least two light beams emitted from the light source along the main scanning direction and to focus the at least two light beams emitted from the light source along the secondary scanning direction;
the optical deflector is configured to deflect and scan at least two light beams emitted from the first optical unit as the optical deflector rotates; and
the second optical unit is configured to make the at least two light beams deflected and scanned by the optical deflector form an image on a scanned surface;
wherein a following expression is satisfied: $(\beta s/\beta m)^2 > 0.6$, wherein:
$\beta m$ denotes a magnification of an optical system of the light scanning unit along the main scanning direction; and
$\beta s$ denotes a magnification of the optical system of the light scanning unit along the secondary scanning direction;
and wherein $\beta s$ is smaller than $\beta m$.

2. The light scanning unit according to claim 1, wherein the magnification $\beta m$ of the optical system of the light scanning unit along the main scanning direction and the magnification $\beta s$ of the optical system of the light scanning unit along the secondary scanning direction also satisfies a following expression:

$$\beta s/\beta m > 0.77.$$

3. The light scanning unit according to claim 2, wherein the magnification $\beta m$ of the optical system of the light scanning unit along the main scanning direction and the magnification $\beta s$ of the optical system of the light scanning unit along the secondary scanning direction also satisfies a following expression:

$$0.77 < \beta s/\beta m < 1.67; \text{ or}$$

$$0.6 < (\beta s/\beta m)^2 < 2.8.$$

4. The light scanning unit according to claim 1, further including:
a diaphragm unit, wherein:
the diaphragm is configured to shape the light beams emitted from the light source.

5. The light scanning unit according to claim 1, further including:
a synchronization signal detecting unit for receiving the light beams deflected from the optical deflector, wherein:
the synchronization signal detecting unit is configured to detect and obtain a synchronization signal; and the synchronization signal is configured to determine a starting position of the light scanning unit when forming the image on the scanned surface.

6. The light scanning unit according to claim 1, wherein the optical deflector includes a polyhedral main body; and a surface of the polyhedral main body forms a plurality of reflecting mirror surfaces; and
the polyhedron main body rotates along a rotating axle, and a central axis of the rotating axle is in parallel with the secondary scanning direction.

7. The light scanning unit according to claim 1, wherein: the second optical unit is an F-θ lens.

8. An electronic image forming apparatus having a light scanning unit comprising the light scanning unit according to claim 1, further comprising:
a photoreceptor, wherein:
the light scanning unit and the photoreceptor are arranged cooperatively, and light beams emitted from the light scanning unit are focused to form an image on a photoreceptive surface of the photoreceptor; and
the photoreceptor is a photosensitive drum, and the photoreceptive surface is a scanned surface; and
the electronic image forming apparatus further comprises a charging roller, a developing unit, a cleaning unit, a transfer roller, and a fixing unit, wherein:
the charging roller rotates and is in contact with the photosensitive drum, such that a focused image on the scanned surface of the photosensitive drum is charged to form an electrostatic latent image;
the developing unit and the photosensitive drum are arranged cooperatively, such that the electrostatic latent image on the photosensitive drum absorbs a developing material in the developing unit to form a developed image;

the transfer roller is abutted against the photosensitive drum to transfer the developed image on the photosensitive drum to a recording medium between the transfer roller and the photosensitive drum, for the fixing unit to perform a fixing processing on the developed image transferred to the recording medium; and the cleaning unit is configured to remove the developing material remaining on the photosensitive drum after transferring the developed image, paragraph including the phrases and the plurality of target strings.

9. A light scanning unit, comprising:

a light source, a first optical unit, an optical deflector, and a second optical unit, wherein:

the light source includes at least two light-emitting points for diverging light beams; the at least two light-emitting points are distributed along a straight line; and an angle between an extension direction of a distribution line of the at least two light-emitting points and a main scanning direction or a secondary scanning direction of the light scanning unit includes an acute angle, wherein the main scanning direction is perpendicular to the secondary scanning direction;

the first optical unit is configured to collimate at least two light beams emitted from the light source along the main scanning direction and to focus the at least two light beams emitted from the light source along the secondary scanning direction;

the optical deflector is configured to deflect and scan at least two light beams emitted from the first optical unit as the optical deflector rotates; and the second optical unit is configured to make the at least two light beams deflected and scanned by the optical deflector form an image on a scanned surface; wherein a following expression is satisfied: $(\beta s/\beta m)^2 > 0.6$, wherein:

$\beta m$ denotes a magnification of an optical system of the light scanning unit along the main scanning direction;

$\beta s$ denotes a magnification of the optical system of the light scanning unit along the secondary scanning direction; and $\beta m$ is 6.25, and $\beta s$ is 5.037.

* * * * *